(12) United States Patent
Yamamoto (10) Patent No.: US 9,464,647 B2
(45) Date of Patent: Oct. 11, 2016

(54) PILLAR GARNISH MOUNTING STRUCTURE AND TETHER CLIP

(71) Applicant: TOYOTA JIDOSHA KABUSHIKI KAISHA, Toyota-shi, Aichi-ken (JP)

(72) Inventor: Kazuhito Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/603,928

(22) Filed: Jan. 23, 2015

(65) Prior Publication Data

US 2015/0211555 A1    Jul. 30, 2015

(30) Foreign Application Priority Data

Jan. 29, 2014    (JP) ................. 2014-014704

(51) Int. Cl.
*B60R 13/02* (2006.01)
*F16B 2/20* (2006.01)

(52) U.S. Cl.
CPC .............. *F16B 2/20* (2013.01); *B60R 13/025* (2013.01); *B60R 13/0206* (2013.01); *Y10T 24/30* (2015.01)

(58) Field of Classification Search
CPC ... F16B 2/20; B60R 13/0206; B60R 13/025; Y10T 24/30
See application file for complete search history.

(56) References Cited

U.S. PATENT DOCUMENTS

| 5,934,729 | A | 8/1999 | Baack | |
|---|---|---|---|---|
| 6,196,607 | B1 | 3/2001 | Gulisano | |
| 6,234,515 | B1 | 5/2001 | Iwanaga | |
| 7,077,449 | B2 * | 7/2006 | Tokunaga | B60R 13/0206 296/187.05 |
| 7,717,458 | B2 * | 5/2010 | Tsuge | B60R 13/02 24/458 |
| 7,976,056 | B2 * | 7/2011 | Kirchen | B60R 13/0206 280/728.2 |
| 8,876,151 | B2 * | 11/2014 | Yamamoto | B60R 13/0206 280/728.3 |
| 2004/0049895 | A1 * | 3/2004 | Draggoo | B60R 13/0206 24/297 |
| 2004/0052575 | A1 * | 3/2004 | Draggoo | B60R 13/0206 403/298 |
| 2004/0245798 | A1 | 12/2004 | Tokunaga | |
| 2005/0071959 | A1 * | 4/2005 | Minnich | B60R 13/0206 24/297 |
| 2006/0290155 | A1 * | 12/2006 | Smith | B60R 11/00 296/29 |
| 2007/0075531 | A1 | 4/2007 | Tsuge | |
| 2008/0098576 | A1 * | 5/2008 | Smith | B60R 11/00 24/297 |
| 2013/0152346 | A1 * | 6/2013 | Kim | B60R 13/0206 24/289 |
| 2013/0168515 | A1 | 7/2013 | Yamamoto | |
| 2013/0257025 | A1 | 10/2013 | Yamamoto | |

(Continued)

FOREIGN PATENT DOCUMENTS

EP    2722534 A1    4/2014
JP    2001-026247 A    1/2001

(Continued)

*Primary Examiner* — Drew Brown
*Assistant Examiner* — Timothy Wilhelm
(74) *Attorney, Agent, or Firm* — Oliff PLC (57) ABSTRACT

A pillar garnish mounting structure includes a tether clip and a pillar garnish. The tether clip has a tether portion. The pillar garnish is attached to a pillar by the tether clip and has a tether housing portion. The tether housing portion has side walls that extend in a longitudinal direction of the pillar garnish. The tether portion has a connecting portion and an anchor portion. The connecting portion is inserted through a space between the side walls and extends in the longitudinal direction of the pillar garnish. The anchor portion is formed on a tip end of the connecting portion, and is positioned to an outside of the tether housing portion. The anchor portion catches on end surfaces of the side walls in the longitudinal direction of the pillar garnish, when the pillar garnish moves in a direction away from the pillar.

15 Claims, 8 Drawing Sheets

(56) References Cited

U.S. PATENT DOCUMENTS

| | | | | |
|---|---|---|---|---|
| 2014/0054879 A1* | 2/2014 | Taguchi | ................ | B60R 21/213 280/730.2 |
| 2014/0319808 A1 | 10/2014 | Yamamoto | | |
| 2015/0191131 A1* | 7/2015 | Yamamoto | ................ | F16B 2/20 24/289 |
| 2015/0210227 A1* | 7/2015 | Yamamoto | ............ | B60R 13/025 296/193.06 |

FOREIGN PATENT DOCUMENTS

| | | |
|---|---|---|
| JP | 3633537 B2 | 3/2005 |
| JP | 2005114124 A | 4/2005 |
| JP | 2006-103426 A | 4/2006 |
| JP | 2006176089 A | 7/2006 |
| JP | 2007-098986 A | 4/2007 |
| JP | 2008-230363 A | 10/2008 |
| JP | 2011-157054 A | 8/2011 |
| JP | 2011-161946 A | 8/2011 |
| JP | 2011-255829 A | 12/2011 |
| JP | 2013-113419 A | 6/2013 |
| JP | 2013-180725 A | 9/2013 |
| JP | 2013-210018 A | 10/2013 |
| WO | 03/029051 A1 | 4/2003 |
| WO | 2012/032603 A1 | 3/2012 |
| WO | 2014/020655 A1 | 2/2014 |

* cited by examiner

PILLAR GARNISH MOUNTING STRUCTURE AND TETHER CLIP

INCORPORATION BY REFERENCE

The disclosure of Japanese Patent Application No. 2014-014704 filed on Jan. 29, 2014 including the specification, drawings and abstract is incorporated herein by reference in its entirety.

BACKGROUND OF THE INVENTION

1. Field of the Invention

The invention relates to a pillar garnish mounting structure (the term "mounting structure" may also be referred to as "mounting device"), and a tether clip used with this mounting structure.

2. Description of Related Art

Japanese Patent Application Publication No. 2011-157054 (JP 2011-157054 A) and Japanese Patent Application Publication No. 2011-161946 (JP 2011-161946 A) describe related tether clips and pillar garnish mounting structures in which a pillar garnish is attached to a pillar using a tether clip. The tether clip has a tether portion that extends in a longitudinal direction of the pillar garnish, and an anchor portion that is provided on a tip end of the tether portion and extends in a direction orthogonal to the tether portion. The pillar garnish has a tether housing portion (a housing space) that includes a bottom wall (top wall) in which a long hole (a clip insertion hole) is formed, and left and right side walls that are connected to the bottom wall. The tether clip is attached to the pillar garnish by aligning the longitudinal directions of the anchor portion and the long hole, inserting the tether portion into the tether housing portion, and rotating it 90 degrees such that the anchor portion intersects with the long hole in the bottom wall of the tether housing portion. When the pillar garnish moves away from a pillar when a curtain airbag (hereinafter, also referred to as a Curtain Shield Airbag (CSA)) deploys, the pillar garnish moves until the anchor portion engages with an edge portion of the long hole, such that a CSA deployment gap forms between the pillar garnish and the pillar. Further movement is prevented, so the pillar garnish will not fly out.

With the structure of the related art, the pillar garnish saves space in a width direction by the tether portion extending in the longitudinal direction of the pillar garnish. However, with the structure of the related art, the pillar garnish does not separate from the tether clip because the anchor portion intersects with the long hole in the bottom wall of the tether housing portion, so the distance between the left and right side walls of the tether housing portion must be equal to or greater than the length of the anchor portion. Therefore, it is difficult to save even more space with the pillar garnish by making the distance between the left and right side walls of the tether housing portion narrower.

SUMMARY OF THE INVENTION

The invention thus provides a pillar garnish mounting structure in which even more space is able to be saved with the pillar garnish by making the distance between the left and right side walls of the tether housing portion narrower, as well as a tether clip used with this pillar garnish mounting structure.

A first aspect of the invention relates to a pillar garnish mounting structure that includes a tether clip and a pillar garnish. The tether clip has a tether portion. The pillar garnish is attached to a pillar by the tether clip and has a tether housing portion. The tether housing portion has a first side wall and a second side wall. The first side wall and a second side wall are juxtaposed to each other and extend in a longitudinal direction of the pillar garnish. The tether portion has a connecting portion and an anchor portion. The connecting portion is inserted through a space between the first side wall and the second side wall and extends in the longitudinal direction of the pillar garnish. The anchor portion is formed on a tip end of the connecting portion, and is positioned to an outside of the tether housing portion in the longitudinal direction of the pillar garnish. The anchor portion is configured to catch on an end surface of the first side wall and an end surface of the second side wall in the longitudinal direction of the pillar garnish, when the pillar garnish moves in a direction away from the pillar.

With the pillar garnish mounting structure according to the first aspect, The anchor portion is configured to catch on the end surfaces of the first side wall and the second side wall in the longitudinal direction of the pillar garnish, and will thus not catch on the edge portion of the long hole in the bottom wall of the tether housing portion as in the related art. Therefore, the distance between the first side wall and the second side wall does not need to be set equal to or greater than the length of the anchor portion as it does in the related art. As a result, the width between the first side wall and the second side wall is able to be narrower than it is with the clip according to the related art, so even more space can be saved with the pillar garnish.

In the first aspect of the invention, the end surfaces of the first side wall and the second side wall may be end surfaces on a vehicle rearward side of the first side wall and the second side wall.

In this pillar garnish mounting structure, the end surfaces of the first side wall and the second side wall are end surfaces on the vehicle rearward side. Therefore, the space between the first side wall and the second side wall is open in the pillar garnish longitudinal direction. Thus, the tether housing portion is able to be manufactured by injection molding using a manufacturing mold. Also, there is no need to form an opening in a front wall of the tether housing portion, so a weld is inhibited from forming on the front wall.

In the first aspect of the invention, the pillar garnish may have a main body wall that extends over an entire length of the pillar garnish. The main body wall may connect a first end portion of the first side wall to a first end portion of the second side wall. The tether housing portion may have a bottom wall and a front wall. The bottom wall may have an insertion hole that is large enough for the anchor portion to be inserted through. The bottom wall may connect a second end portion of the first side wall to a second end portion of the second side wall. The first end portion of the first side wall may be positioned on a side opposite the second end portion of the first side wall, and the first end portion of the second side wall may be positioned on a side opposite the second end portion of the second side wall. The front wall may connect the first side wall to the second side wall on a side opposite to the end surfaces of the first side wall and the second side wall.

In the first aspect of the invention, the tether housing portion may have a third side wall that is juxtaposed to the first side wall and the second side wall. The first side wall may be positioned between the second side wall and the third side wall. The first side wall may be parallel to the second side wall.

In this pillar garnish mounting structure, the first side wall serves as a center side wall. Therefore, the distance between the first side wall and the second side wall on both sides of the space through which the tether portion is inserted is able to be narrower, and the strength of the tether housing portion is able to be higher, than they are when the center side wall is not provided, i.e., than it is when the first side wall does not serve as the center side wall.

In the first aspect of the invention, each of the end surfaces of the first side wall and the second side wall may have a predetermined portion with which the anchor portion engages when the pillar garnish moves in a direction away from the pillar. The predetermined portion may be slanted to a plane perpendicular to an axial direction of the tether clip.

In this pillar garnish mounting structure, the end surfaces of the first side wall and the second side wall are slanted in a direction that reduces the bending angle of the anchor portion. Therefore, the tether portion is inhibited from being damaged by a large bending force being applied to thereto when the pillar garnish moves in a direction away from the pillar and the anchor portion engages with the end surfaces of the first side wall and the second side wall.

In the first aspect of the invention, a recessed portion that is recessed in a direction away from the anchor portion in the longitudinal direction of the pillar garnish may be formed on a portion of the first side wall that faces the anchor portion and a portion of the second side wall that faces the anchor portion.

In this pillar garnish mounting structure, the tether portion is inhibited from being damaged by a large bending force being applied to thereto when the pillar garnish moves in a direction away from the pillar and the anchor portion engages at the recessed portion.

In the first aspect of the invention, the tether clip may have a base, and a garnish retaining portion that is connected to the base. The tether portion may have a first relative rotation inhibiting piece. The connecting portion may extend between one of the base and the garnish retaining portion, and the anchor portion in the longitudinal direction of the pillar garnish. The first relative rotation inhibiting piece may branch off from the connecting portion, and be configured to, when the tether portion rotates relative to the tether housing portion, inhibit further relative rotation of the tether portion by abutting against the first side wall and the second side wall of the tether housing portion. At least a portion of the first relative rotation inhibiting piece may be positioned in the space between the first side wall and the second side wall.

In this pillar garnish mounting structure, the first relative rotation inhibiting piece is provided on the connecting portion of the tether portion. Therefore, the tether clip is inhibited from rotating relative to the tether housing portion and coming off when the tether clip is pushed by the deploying CSA.

Also, in the first aspect of the invention, the first relative rotation inhibiting piece may extend toward the base.

Also, in the first aspect of the invention, the tether portion may have a second relative rotation inhibiting piece. The second relative rotation inhibiting piece may be connected to the anchor portion, and be configured to, when the tether portion rotates relative to the tether housing portion, inhibit further relative rotation of the tether portion by abutting against the first side wall and the second side wall of the tether housing portion. At least a portion of the second relative rotation inhibiting piece may be positioned in the space between the first side wall and the second side wall.

In this pillar garnish mounting structure, the second relative rotation inhibiting piece is provided on the anchor portion. Therefore, the tether clip is inhibited from rotating relative to the tether housing portion and coming off when the tether clip is pushed by the deploying CSA. Because the first relative rotation inhibiting piece and the second relative rotation inhibiting piece are provided, relative rotation of the tether clip with respect to the tether housing portion is able to be even more reliably inhibited than it is when only the first relative rotation inhibiting piece is provided.

Also, in the first aspect of the invention, the garnish retaining portion may have a rising portion and a bulging portion. The rising portion may rise from the base. The bulging portion may extend from a tip end of the rising portion in a direction away from the base, and bulge out in a direction orthogonal to a rising direction of the rising portion.

In the first aspect of the invention, the tether clip may have a base and a garnish retaining portion that is connected to the base. The tether portion may have a relative rotation inhibiting piece. The connecting portion may extend between one of the base and the garnish retaining portion, and the anchor portion. The relative rotation inhibiting piece may be connected to the anchor portion, and be configured to, when the tether portion rotates relative to the tether housing portion, inhibit further relative rotation of the tether portion by abutting against the first side wall and the second side wall of the tether housing portion. At least a portion of the relative rotation inhibiting piece may be positioned in the space between the first side wall and the second side wall.

In this pillar garnish mounting structure, the relative rotation inhibiting piece is provided on the anchor portion. Therefore, the tether clip is inhibited from rotating relative to the tether housing portion and coming off when the tether clip is pushed by the deploying CSA.

In the first aspect of the invention, a distance between an inside surface of the first side wall and an inside surface of the second side wall may be larger than a width of the connecting portion in a direction perpendicular to a longitudinal direction of the pillar garnish, and smaller than a length of the anchor portion in a longitudinal direction of the anchor portion.

In order for the anchor portion to catch on the first side wall and the second side wall, the distance between the first side wall and the second side wall is set smaller than the length of the anchor portion. As a result, the distance between the first side wall and the second side wall of the tether housing portion is less than it is with the clip according to the related art, so space is able to be saved in the width direction with the pillar garnish.

Also, in the first aspect of the invention, the anchor portion may be rotatable relative to the connecting portion clockwise or counterclockwise as seen from a tip side of the tether portion in the longitudinal direction of the pillar garnish.

A second aspect of the invention relates to a tether clip that includes a base, a garnish retaining portion, and a tether portion. The garnish retaining portion is connected to the base. The tether portion has a connecting portion, an anchor portion, and at least one relative rotation inhibiting piece. The anchor portion is provided on a tip end of the tether portion. The connecting portion extends between one of the base and the garnish retaining portion, and the anchor portion in the longitudinal direction of the pillar garnish. The relative rotation inhibiting piece is connected to at least one of the connecting portion and the anchor portion.

With the tether clip according to the second aspect of the invention, the tether clip has at least one relative rotation inhibiting piece that is connected to at least one of the connecting portion and the anchor portion. The tether clip that has this relative rotation inhibiting piece may be suitably used when it is necessary that relative rotation of the tether clip with respect to the pillar garnish be inhibited when the tether clip is assembled to the pillar garnish.

Also, in the second aspect of the invention, the garnish retaining portion may have a rising portion and a bulging portion. The rising portion may rise from the base. The bulging portion may extend from a tip end of the rising portion in a direction away from the base, and bulge out in a direction orthogonal to a rising direction of the rising portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
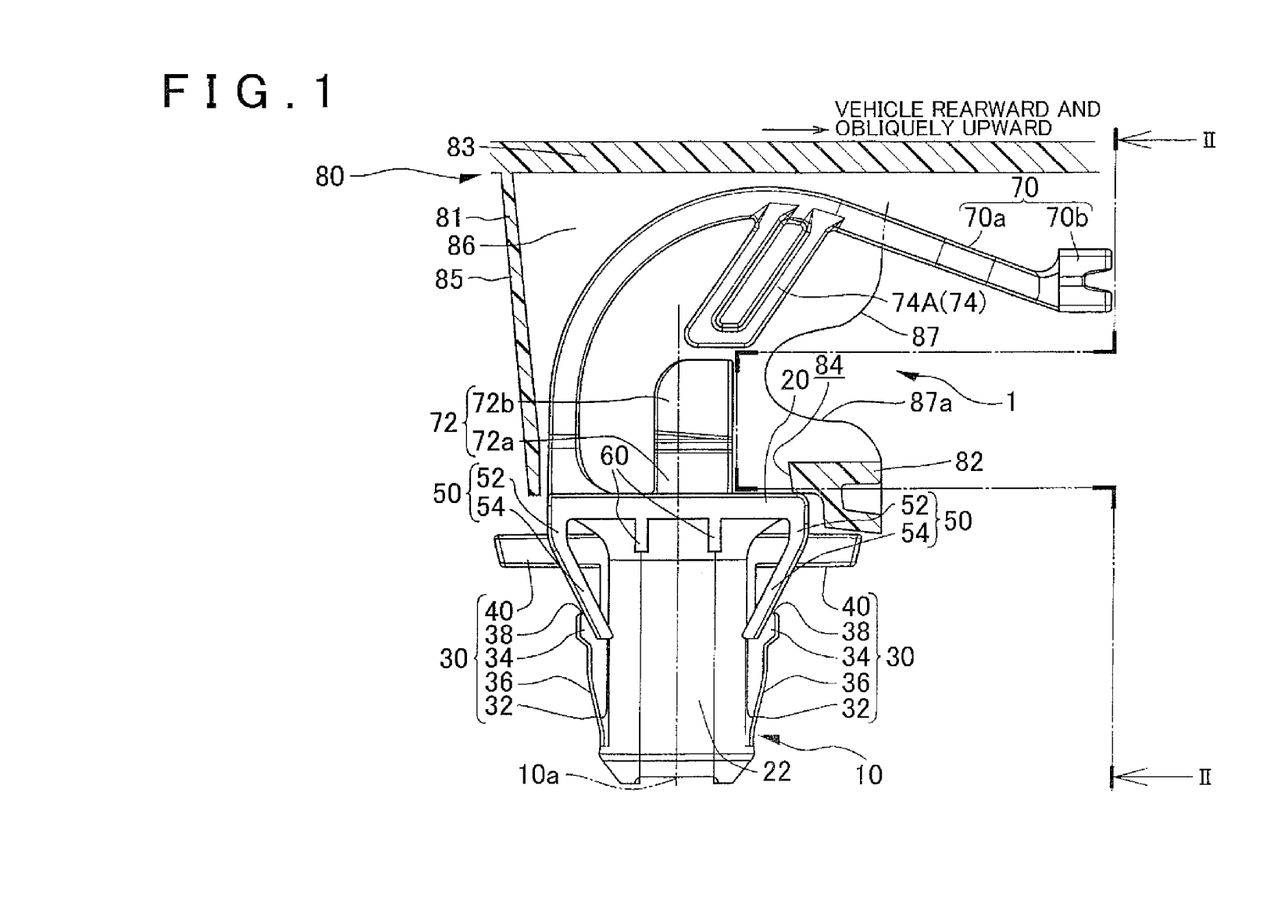
FIG. 1 is a sectional view of the main portions of a pillar garnish mounting structure according to a first example embodiment of the invention.
Figure 2:
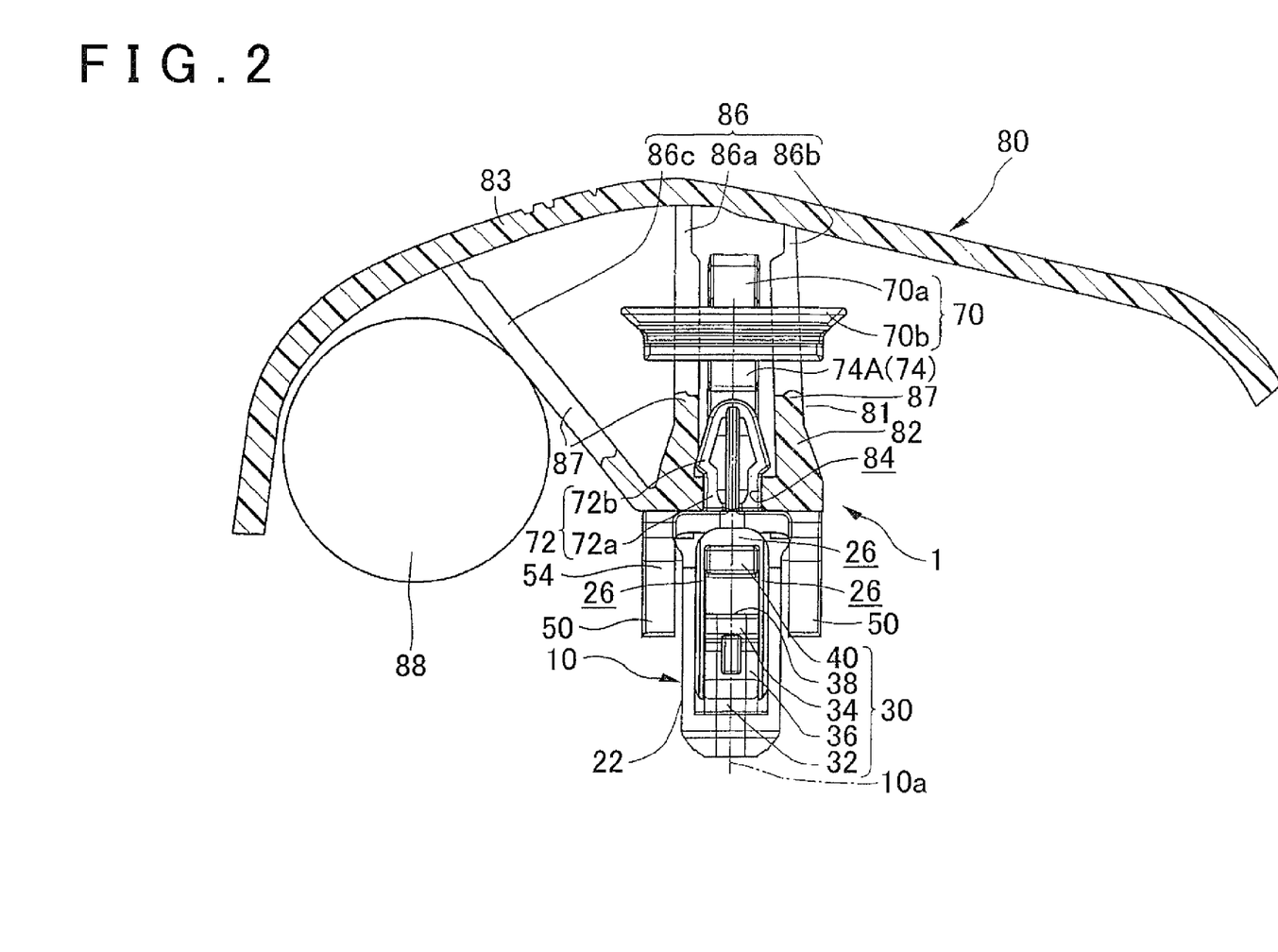
FIG. 2 is a sectional view taken along line II-II, shown reduced compared to FIG. 1, of the pillar garnish mounting structure in FIG. 1.
Figure 3:
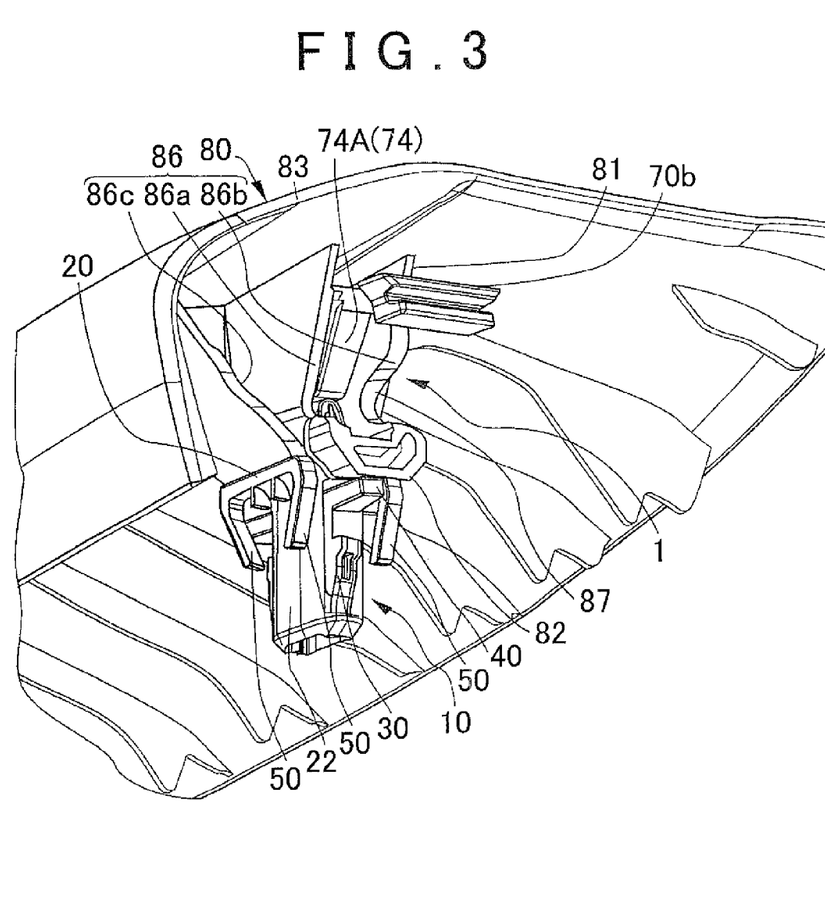
FIG. 3 is a perspective view of the pillar garnish mounting structure in FIG. 2.
Figure 4:
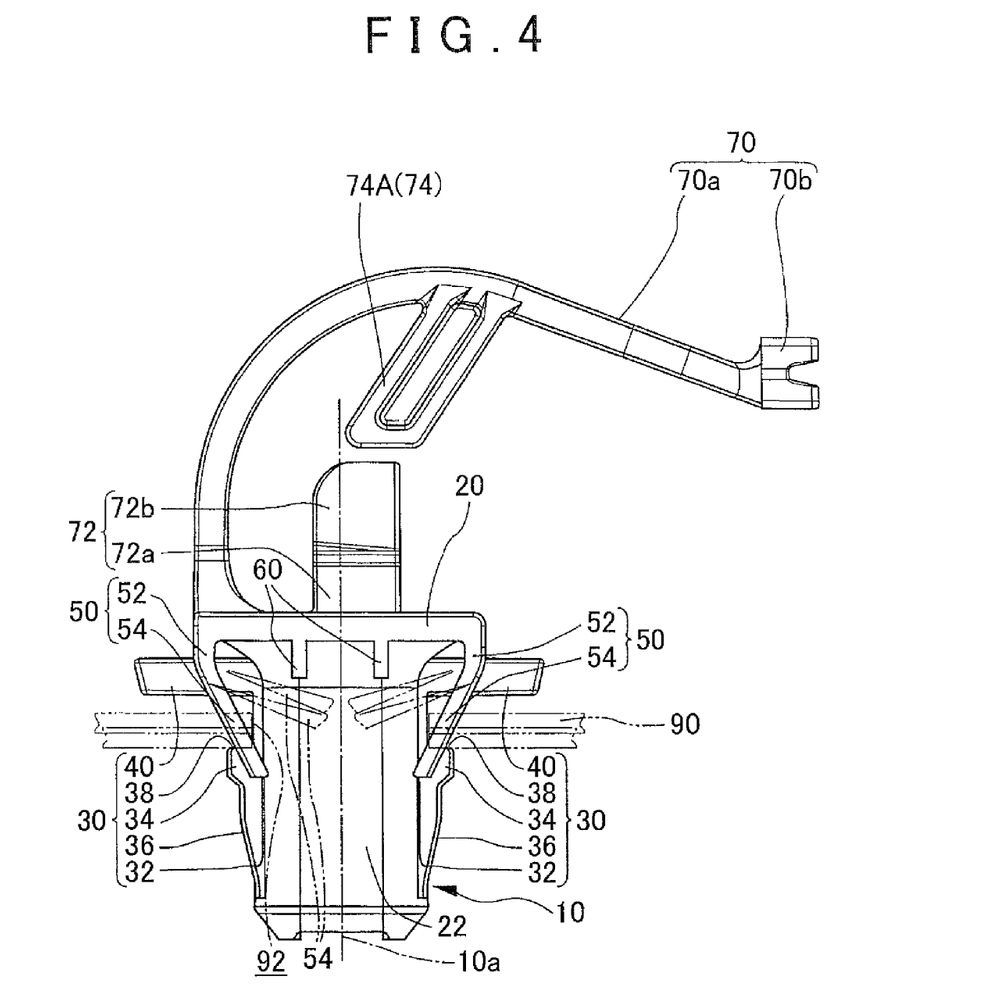
FIG. 4 is a front view of a tether clip according to the first example embodiment of the invention, which is used with the pillar garnish mounting structure in FIG. 1.
Figure 5:
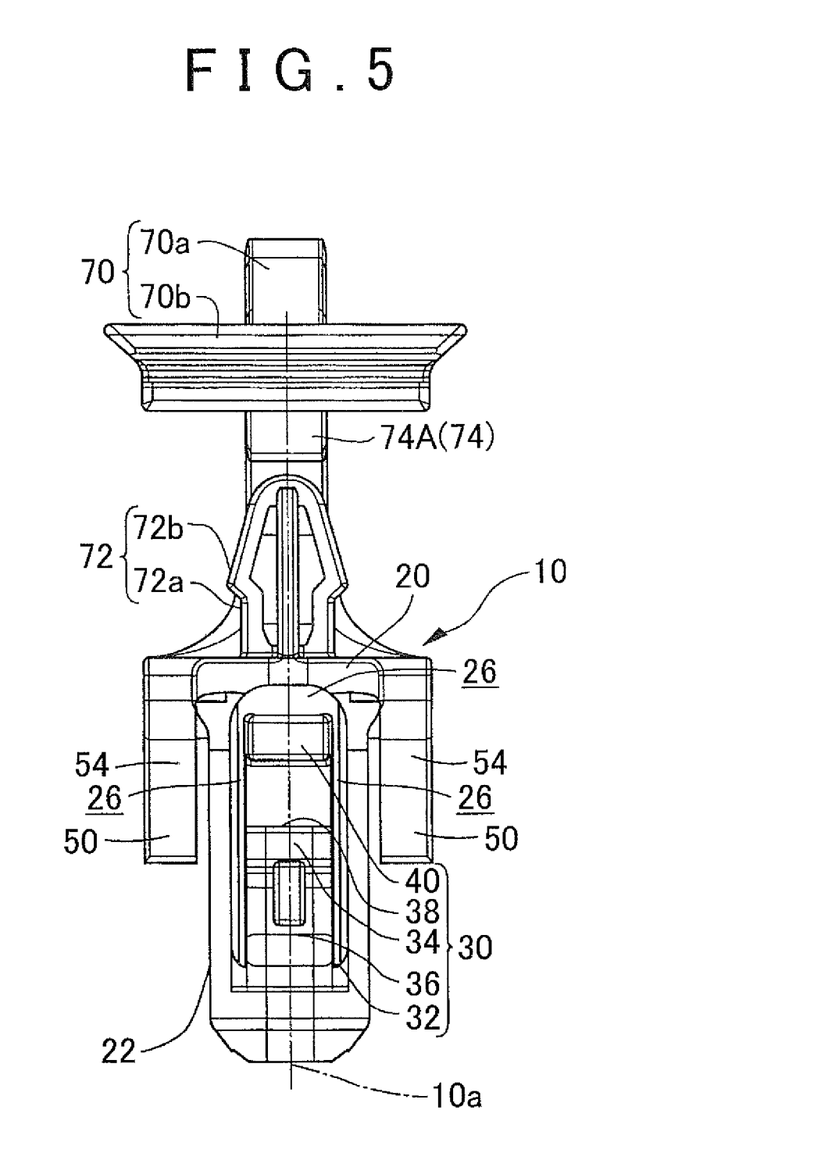
FIG. 5 is a side view of the tether clip in FIG. 4.
Figure 6:
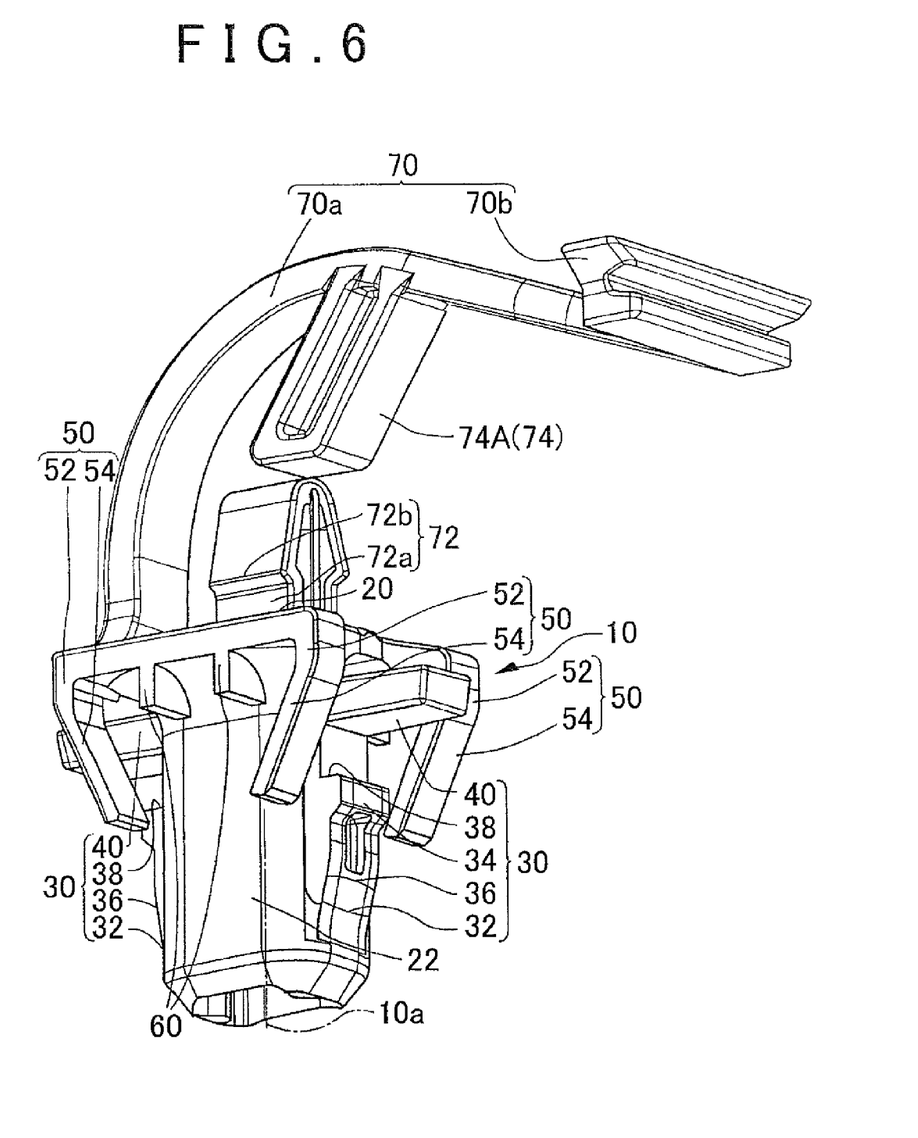
FIG. 6 is a perspective view of the tether clip in FIG. 4.
Figure 7:
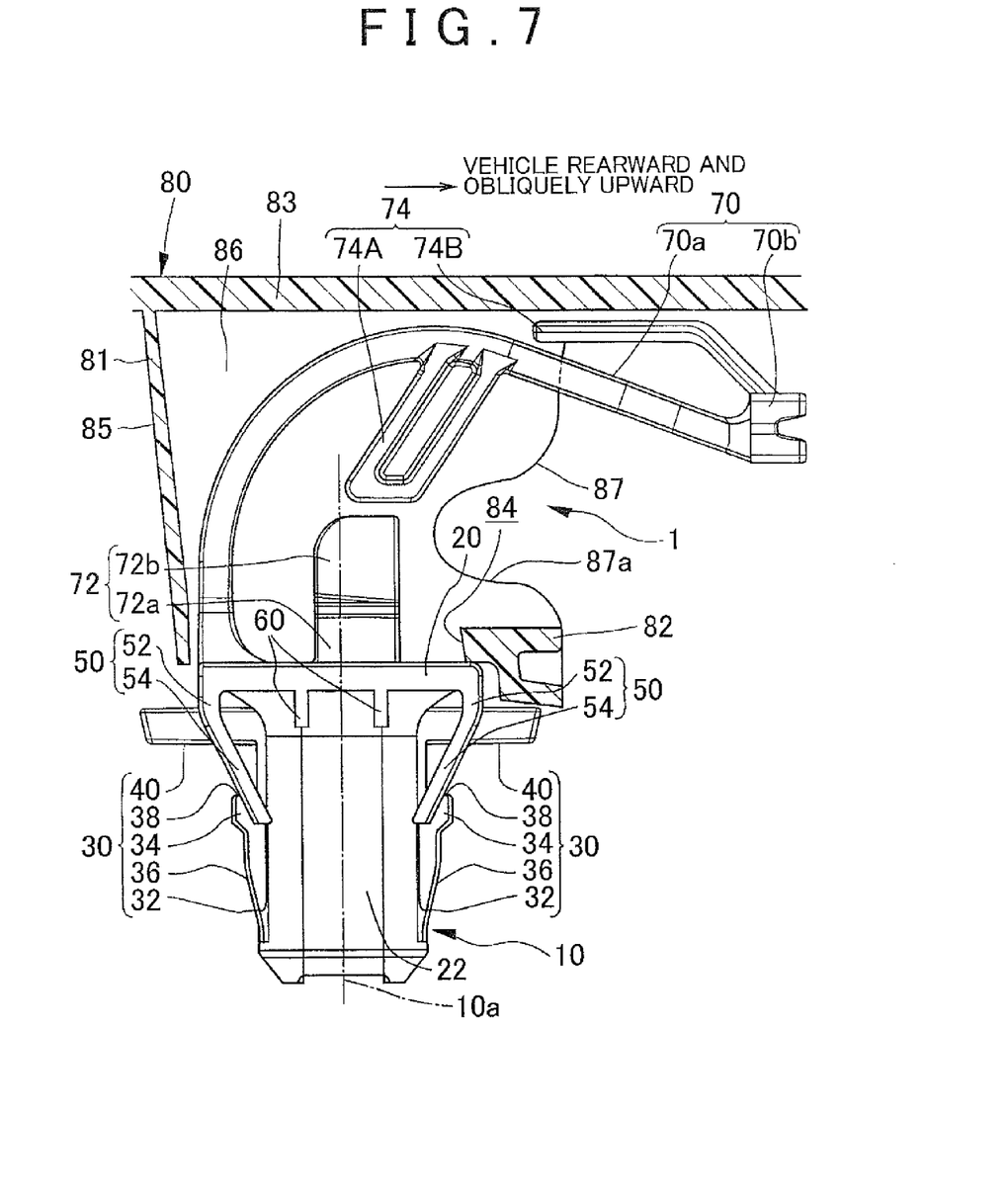
FIG. 7 is a sectional view of the main portions of a pillar garnish mounting structure according to a second example embodiment of the invention.
Figure 8:
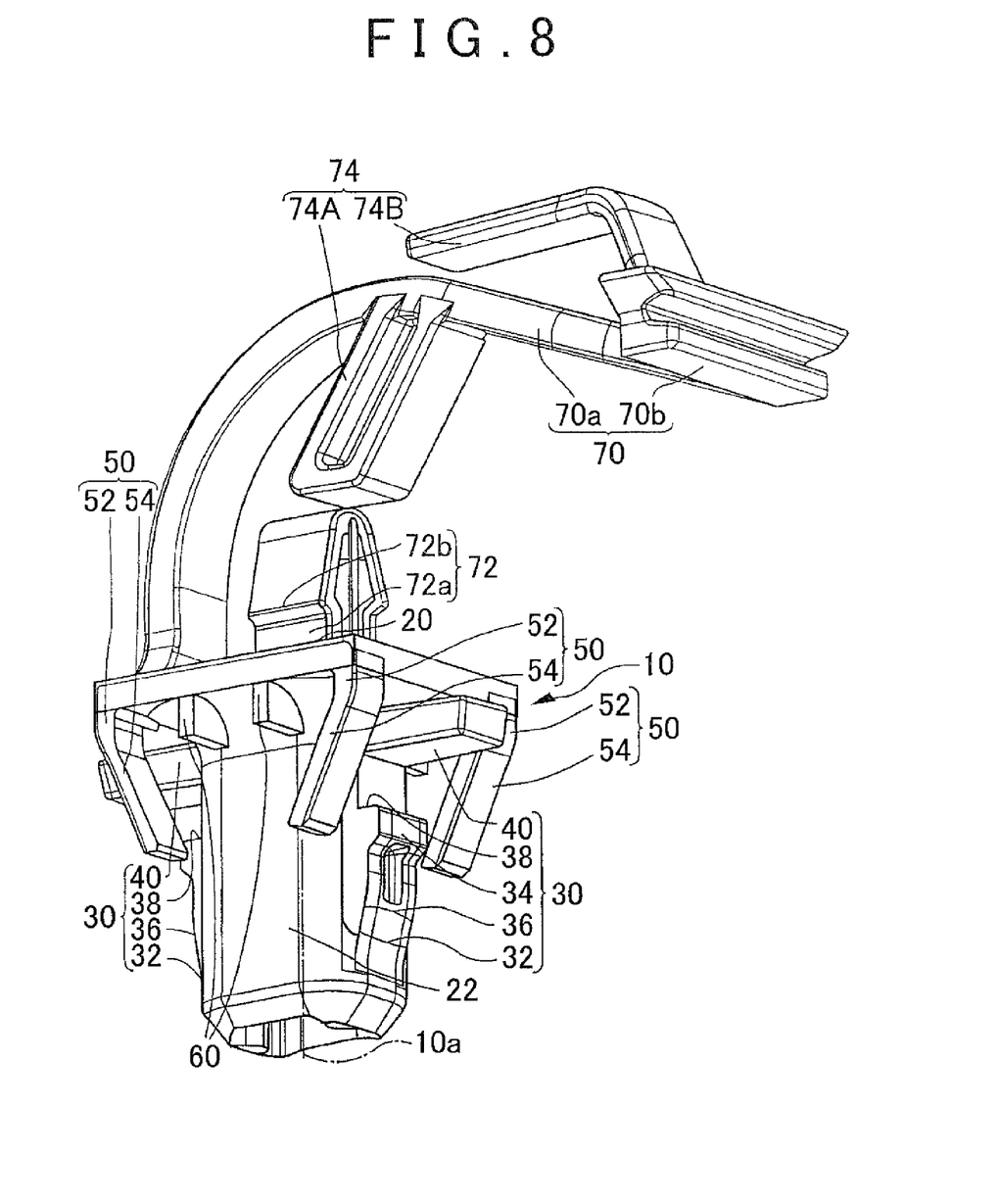
FIG. 8 is a perspective view of a tether clip according to the second example embodiment of the invention, which is used with the pillar garnish mounting structure in FIG. 7.

A pillar garnish mounting structure 1 and a tether clip (hereinafter, also simply referred to as "clip") 10 used with the pillar garnish mounting structure 1, according to example embodiments of the invention will now be described with reference to the accompanying drawings. FIGS. 1 to 3 are views of the pillar garnish mounting structure 1 according to a first example embodiment of the invention. FIGS. 4 to 6 are views of the clip 10 according to the first example embodiment of the invention. FIG. 7 is a view of the pillar garnish mounting structure 1 according to a second example embodiment of the invention. FIG. 8 is a view of the clip 10 according to the second example embodiment of the invention. Component parts common among the pillar garnish mounting structures and the clips according to all of the example embodiments of the invention will be denoted by like reference characters throughout all of the example embodiments of the invention. The main portion of the pillar garnish mounting structure 1 is the clip 10, so the main portions of the clip 10 and the pillar garnish mounting structure 1 may be regarded as the same.

[Pillar Garnish Mounting Structure 1 and Clip 10 of the First Example Embodiment]

The structures of the pillar garnish mounting structure 1 and the clip 10 of the first example embodiment will be described together with their operation. The pillar garnish mounting structure 1 according to the first example embodiment of the invention is a pillar garnish mounting structure that attaches a pillar garnish 80 to a pillar 90 using the clip 10 that has a tether portion 70 with an anchor portion 70b formed on a tip end. The pillar garnish 80 may be a front pillar garnish of a vehicle, and the pillar 90 may be an inner panel of a front pillar of a vehicle.

The clip 10 is made of flexible resin material. The resin material is polyhexamethylene adipamide, for example. However, another resin material may also be used as long as it is flexible and has the necessary strength. The pillar garnish 80 is made of resin material that is as or more rigid than the clip 10. The pillar 90 is made of steel sheet.

There is a space between the pillar garnish 80 and the pillar 90, and the CSA 88 that is made of fabric is arranged folded in this space. When the vehicle is involved in a side collision, inflating gas is supplied from an inflator and the CSA 88 consequently inflates and deploys, pushing the pillar garnish 80 in a direction away from the pillar 90. The clip 10 creates a gap between the pillar garnish 80 and the pillar 90, which enables the CSA 88 to deploy toward the vehicle cabin. Also, the clip 10 inhibits the pillar garnish 80 from flying farther out into the vehicle cabin. In order to perform this kind of operation, the pillar garnish 80 and the clip 10 have the structures described below.

The pillar garnish 80 is provided with its longitudinal direction parallel to the longitudinal direction of the pillar 90, and extending along the pillar 90. The pillar garnish 80 has a main body wall 83 that extends the entire length of the pillar garnish 80 in the longitudinal direction of the pillar garnish 80. The pillar garnish 80 has a tether housing portion 81 that is locally provided on a portion of the pillar garnish 80, and extends in the longitudinal direction of the pillar garnish 80, on a back surface of the main body wall 83 when viewed from the vehicle cabin side. The tether housing portion 81 is provided protruding toward the pillar 90 side. The pillar garnish 80 is attached to the pillar 90 by the clip 10 at the tether housing portion 81. As will be described later, the clip 10 has the tether portion 70, and this tether portion 70 has a connecting portion 70a and an anchor portion 70b on a tip end of the connecting portion 70a.

The tether housing portion 81 has at least two side walls 86a and 86b that extend in a pillar garnish longitudinal direction (i.e., the longitudinal direction of the pillar garnish 80). In the illustrated example, the tether housing portion 81 has three side walls 86a, 86b, and 86c that extend in the pillar garnish longitudinal direction. These three side walls 86a, 86b, and 86c together make up a side wall 86. Two of these three side walls are left and right side walls 86b and 86c, and one is a side wall 86a that is provided between the left and right side walls 86b and 86c. Here, the left and right side walls 86b and 86c may be regarded as outside side walls. Also, the side wall 86a may be regarded as a center side wall. The side wall 86a and one of the outside side walls, i.e., the side wall 86b, are juxtaposed and parallel to each other. A portion of the clip 10 is inserted into the space between the two side walls 86a and 86b. The distance between inside surfaces of the two side walls 86a and 86b is greater than a width of the connecting portion 70a of the tether portion 70 of the clip 10, and smaller than the length in the longitudinal direction of the anchor portion 70b of the clip 10.

The space between the three side walls 86a, 86b, and 86c extends in the pillar garnish longitudinal direction, and is open on a vehicle rearward and obliquely upward side (i.e., a side toward the rear of the vehicle and upward at an angle) when the pillar garnish 80 is attached to the pillar 90. Each of the three side walls 86a, 86b, and 86c have a side wall end surface 87 facing the vehicle rearward and obliquely upward side. The space between the three side walls 86a, 86b, and 86c is closed off by a front wall 85 on a vehicle forward and obliquely downward side (i.e., a side toward the front of the vehicle and downward at an angle).

The tether housing portion 81 has a bottom wall 82 that connects end portions of the side walls 86a, 86b, and 86c on the side opposite the main body wall 83. A portion of the bottom wall 82 that is on the vehicle rearward and obliquely upward side is thicker and stronger than the other portions of the bottom wall. A thin portion is provided to reduce weight and save material. A rectangular tether portion insertion hole 84 is formed in the bottom wall 82. As shown in FIGS. 1 and 2, the length of a long side of the tether portion insertion hole 84 is longer than the length of the anchor portion 70b in the longitudinal direction thereof. As shown in FIG. 2, the length of a short side of the tether portion insertion hole 84 is longer than the width of the connecting portion 70a of the tether portion 70, and substantially the same as the distance between the inside surfaces of the two side walls 86a and 86b. When assembling the clip 10 to the pillar garnish 80, the longitudinal direction of the anchor portion 70b is aligned with the direction of the long side of the tether portion insertion hole 84, and the anchor portion 70b is passed through the tether portion insertion hole 84. Then the anchor portion 70b is inserted between the two side walls 86a and 86b until it comes out from between the two side walls 86a and 86b, at which time it is rotated 90 degrees. When the pillar garnish 80 moves away from the pillar 90 when the CSA deploys, the anchor portion 70b catches on the side wall end surfaces 87 of the two side walls 86a and 86b and is retained.

The anchor portion 70b catches on the two side walls 86a and 86b when the CSA deploys. Each of side wall end surfaces 87 of the side walls 86a and 86b in the pillar garnish longitudinal direction has a portion 87a that retains the anchor portion 70b when the CSA deploys. The portion 87a is slanted to a plane perpendicular to the axial direction of the clip 10. That is, the portion 87a is slanted in a direction that reduces the bending angle of the anchor portion 70b. This slant may be linear, or curved, or a combination of linear and curved. Also, a recessed portion (curved surface) that is recessed forward is formed on a rear half portion of the side walls 86a and 86b in the pillar garnish longitudinal direction, such that when the CSA deploys, the anchor portion 70b goes all the way in to the slanted portion 87a and is able to engage therewith. The bending angle of the anchor portion 70b is able to be reduced by the anchor portion 70b engaging with the slanted portion 87a of the recessed portion (curved surface). As a result, the bending angle of a base portion of the anchor portion 70b of the connecting portion 70a when the CSA deploys is small, so the tether portion 70 is unlikely, or much less likely, to fracture at the base portion of the anchor portion 70b of the connecting portion 70a.

The clip 10 has a base 20, the tether portion 70, and a garnish retaining portion (i.e., engagement retaining portion) 72. The garnish retaining portion 72 rises from one side of the base 20. The tether portion 70 rises from the surface on the same side as the surface that the garnish retaining portion 72 of the base 20 rises from, or extends from a tip end portion of the garnish retaining portion 72.

The tether portion 70 has the connecting portion 70a and the anchor portion 70b that is formed on the tip end of the connecting portion 70a. The connecting portion 70a extends between one of the base 20 and the garnish retaining portion 72, and the anchor portion 70b. The connecting portion 70a is inserted through the space between the two side walls 86a and 86b and extends in the pillar garnish longitudinal direction when the clip 10 is attached to the pillar garnish 80. The anchor portion 70b is positioned to the outside of the tether housing portion 81 in the longitudinal direction of the pillar garnish when the clip 10 is attached to the pillar garnish 80. The anchor portion 70b is a predetermined distance away from an end of the tether housing portion 81 in the pillar garnish longitudinal direction, such that when the CSA deploys, the pillar garnish 80 is able to move away from the pillar 90 until the anchor portion 70b abuts against the end portion of the tether housing portion 81 in the pillar garnish longitudinal direction.

The connecting portion 70a curves in a plane that extends in the pillar garnish longitudinal direction. The anchor portion 70b extends linearly in a direction orthogonal to a plane that extends in the pillar garnish longitudinal direction. The connecting portion 70a has a smaller width than the distance between the inside surfaces of the side walls 86a and 86b of the tether housing portion 81, and the anchor portion 70b has a greater length than the distance between the side walls 86a and 86b of the tether housing portion 81. According to this structure, when the pillar garnish 80 moves in a direction away from the pillar 90 when the CSA deploys, the anchor portion 70b catches on the end surfaces 87 of the two side walls 86a and 86b in the pillar garnish longitudinal direction, thereby inhibiting the pillar garnish 80 from coming off of the clip 10.

When inhibiting the pillar garnish 80 from coming off of the clip 10 and flying out by having the anchor portion 70b engage with the end surfaces 87 of the two side walls 86a and 86b, it is preferable that relative rotation of the clip 10 with respect to the pillar garnish 80 be inhibited in order to retain the pillar garnish 80. This is to eliminate the possibility of the pillar garnish 80 coming off of the clip 10 by the anchor portion 70b rotating relative to the tether housing portion 81, passing between the side walls 86a and 86b, and coming out of the tether portion insertion hole 84 in the bottom wall 82 when a shaft portion, described later, of the clip 10 is pushed by the CSA 88.

In order to inhibit the tether portion 70 from rotating relative to the tether housing portion 81, the tether portion 70 has a relative rotation inhibiting piece 74. The relative rotation inhibiting piece 74 is integrally connected to the tether portion 70. At least a portion of the relative rotation inhibiting piece 74 is positioned in the space between the two side walls 86a and 86b. When the tether portion 70 tries to rotate relative to the tether housing portion 81 when the CSA deploys, the tether portion 70 and the relative rotation inhibiting piece 74 will abut against the two side walls 86a and 86b of the tether housing portion 81, inhibiting the tether portion 70 from rotating any further. The relative rotation inhibiting piece 74 is connected to at least one of the connecting portion 70a and the anchor portion 70b of the tether portion 70.

The garnish retaining portion 72 has the rising portion 72a that rises from the base 20 by an amount substantially equal to the thickness of a peripheral edge portion of the tether portion insertion hole 84 in the bottom wall 82, and a bulging portion 72b that extends even farther from a tip end of the rising portion 72a in a direction away from the base 20, and bulges out in a direction orthogonal to the rising direction of the rising portion 72a. The bulging portion 72b is formed in a hollow shape so as to have elasticity in a direction orthogonal to the rising direction.

When attaching the clip 10 to the pillar garnish 80, the tether portion 70 is inserted through the tether portion insertion hole 84 in the bottom wall 82, and the garnish retaining portion 72 is pushed into the tether portion insertion hole 84 in the bottom wall 82. At this time, the bulging portion 72b elastically deforms in a direction that reduces the bulging amount, and slips through the tether portion insertion hole 84. When the bulging portion 72b slips through the tether portion insertion hole 84, the bulging portion 72b elastically returns to its original position (the position when the bulging portion 72b is in a free state), such that the bottom wall 82 is retained between the bulging portion 72b and the base 20. The tether clip 10 is attached to the pillar 90 while this state is maintained.

When the CSA deploys and the pillar garnish 80 is pushed away from the pillar 90 by the inflating CSA 88, the peripheral edge portion of the tether portion insertion hole 84 pushes the bulging portion 72b of the garnish retaining portion 72 in a direction in which the bulging portion 72b will slip through the tether portion insertion hole 84, thereby elastically deforming the bulging portion 72b in a direction in which the bulge amount is reduced and the bulging portion 72b consequently slips through the tether portion insertion hole 84. As a result, the bottom wall 82 comes away from the bulging portion 72b of the garnish retaining portion 72. Meanwhile, the pillar garnish 80 is able to move until the anchor portion 70b of the tether portion 70 engages with the pillar garnish longitudinal direction end surfaces 87 of the side walls 86a and 86b.

The clip 10 may also include a shaft portion (which may also be referred to as a leg portion or a body mounting portion) 22, a retaining protrusion 30, and a rattle inhibiting elastic piece (hereinafter, also simply referred to as "elastic piece") 50. The shaft portion 22, the retaining protrusion 30, and the elastic piece 50 are at the same side of the base 20 in the clip axial direction. The shaft portion 22 is connected to the surface of the base 20 that is at the opposite side from the surface on which the tether portion 70 is provided, and extends away from the base 20 in a direction orthogonal to the base 20. The retaining protrusion 30 extends from a connecting portion 32 that is in a position away from the base 20 in the clip axial direction, toward the base 20 and ends at a free end. The connecting portion 32 is part of the retaining protrusion 30 that is connected to the shaft portion 22. One or more of the elastic pieces 50 is provided.

The central axis of the shaft portion 22 is aligned with a central axis 10a of the clip 10. The shaft portion 22 is hollow. The outer shape of a cross-section of the shaft portion 22 in a direction orthogonal to the clip central axis 10a is generally rectangular or generally round. Generally rectangular includes a square or rectangular shape with rounded corners. The illustrated example shows the outer shape of the cross-section of the shaft portion 22 being generally rectangular.

Two openings are provided in portions of the shaft portion 22 that face each other across the clip central axis 10a. The retaining protrusions 30 are respectively provided to the openings. The space between the edge portion of the openings in the shaft portion 22 and the retaining protrusion 30 is a slit 26. The retaining protrusions 30 face each other in a direction orthogonal to the clip axial direction, and are symmetrical about the clip central axis 10a.

Each retaining protrusion 30 is separated by the slit 26 from the base 20 and the shaft portion 22, except for at the connecting portion 32. That is, the slit 26 is provided between the retaining protrusion 30, and the base 20 and the shaft portion 22, except for at the connecting portion 32 between the shaft portion 22 and the retaining protrusion 30. The slit 26 has an inverted U-shape. An axial position of an end portion of the inverted U-shaped slit 26 on the side away from the base 20 matches, or substantially matches, an axial position of the connecting portion 32. The retaining protrusion 30 is able to elastically deform in a direction toward and away from the clip central axis 10a, i.e., in a direction in which it bends and stands erect around the connecting portion 32, because the clip 10 is made of flexible resin material.

Each retaining protrusion 30 has a protruding portion 34 and an engagement release lever 40. The protruding portion 34 and the engagement release lever 40 are separated from each other in the clip axial direction. The protruding portion 34 protrudes out farther in a direction away from the clip central axis 10a than the outer surface of the shaft portion 22, when the retaining protrusion 30 is in a free state, i.e., when a load is not being applied to the retaining protrusion 30. That is, a portion of the retaining protrusion 30 that protrudes out farther in a direction away from the clip central axis 10a than the outer surface of the shaft portion 22 is the protruding portion 34. The protruding portion 34 has a sliding surface 36 that is slanted away from the clip central axis 10a, from the connecting portion 32 toward a base 20 side tip end portion of the retaining protrusion 30, on at least a portion of the protruding portion 34 in the clip axial direction. This sliding surface 36 slides on a body retaining hole 92 inside surface when the clip 10 is inserted into the body retaining hole 92 shown in FIG. 4. The point where the sliding surface 36 starts to slant may be at the connecting portion 32, or it may be at a position away from the connecting portion 32 in the clip axial direction.

The retaining protrusion 30 bends and deforms in a direction toward the clip central axis 10a when the sliding surface 36 is pushed on by the inside surface of the body retaining hole 92 as the clip 10 is inserted into the body retaining hole 92 of the pillar 90, and elastically returns to its original position (i.e., the position it is in a free state) once the retaining protrusion 30 has passed through the body retaining hole 92. After elastically returning to its original position, the body retaining surface 38 that is a base-facing surface of the protruding portion 34 of the retaining protrusion 30 engages in the clip axial direction with a body retaining hole 92 peripheral edge portion of the pillar 90, such that the clip 10 will not come out of the body retaining hole 92, or will not come out of the body retaining hole 92 easily.

The engagement release lever 40 is provided on each retaining protrusion 30. The engagement release lever 40 is provided on a retaining protrusion tip end portion at the side near the base 20 in the clip axial direction, and extends away from the clip central axis 10a at substantially a right angle to the clip central axis 10a. A tip end of the engagement release lever 40 is positioned farther away from the clip central axis 10a than an outside end of the protruding portion 34 is. Also, the tip end of the engagement release lever 40 is positioned farther away from the clip central axis 10a than an outside end of the base 20 is in the same direction.

When removing the clip 10 from the body retaining hole 92 during servicing, the engagement release levers 40 of the retaining protrusions 30 are pushed toward each other until the distance between the outside surfaces of the protruding portions 34 is the same or less than the distance between opposite positions on the inside surface of the body retaining hole 92, and then the clip 10 is pulled in the clip axial direction so that the shaft portion 22 is pulled out of the body retaining hole 92.

The elastic piece 50 inhibits the clip 10 from rattling against the pillar 90 by absorbing looseness between the clip 10 and the pillar 90 as the elastic piece 50 elastically deforms when the clip 10 is attached to the pillar 90. The elastic piece 50 may be integrally formed with the clip 10, as it is in the illustrated example, or it may be formed on a separator, not shown, that is separate from the clip 10.

The elastic piece 50 has a slanted portion 54. The slanted portion 54 extends at an angle with respect to the base 20, from an elastic piece portion that is provided adjacent to a base portion (e.g., a base end portion) in a clip axial direction, toward the clip central axis 10a side, and away from the base 20. The base portion is a portion of the base 20, and is separated from the clip central axis 10a.

The elastic piece portion that corresponds in the clip axial direction to the base portion of the base 20 that is separated from the central axis 10a may be a portion of the clip 10 itself, or it may be a portion of a separator, not shown, that is separate from the clip 10. Also, when the elastic piece 50 is integrally formed with the base 20, the elastic piece portion may be an elastic piece portion that is aligned with the base portion in the clip axial direction, or it may be an elastic piece portion that is separated from the base portion in the clip axial direction by the length of an axial portion 52 that will be described later.

The elastic piece 50 is provided at opposite sides across the clip central axis 10a, as shown in FIG. 4, in a direction parallel to a plane that includes the left and right slanted portions 54. Also, the elastic piece 50 is provided at opposite sides across the clip central axis 10a, as shown in FIG. 5, in a direction orthogonal to a plane that includes the slanted portions 54. Thus, four of the elastic pieces 50 are provided, as shown in FIG. 6.

The slanted portions 54 extend at an angle toward the clip central axis 10a side and away from the base 20, as shown in FIG. 4, in a direction parallel to a plane that includes the slanted portions 54. Therefore, the distance between the slanted portions 54 of the elastic pieces 50 at opposite sides across the clip central axis 10a becomes narrower farther away from the base 20.

The slanted portions 54 extend at an angle toward the clip central axis 10a side. Therefore, even if a large elastic piece deformation allowance is ensured in the clip insertion direction by making a length component of the elastic piece 50 in the clip axial direction larger, the flat surface required for the clip mounting seat will not be any wider. Also, by making the elastic piece deformation allowance greater, a region where the change in the elastic piece reaction force with respect to the clip insertion amount is small (this region is also referred to as a flat region) is able to be formed across a wide elastic piece deformation area, in the characteristic of the elastic piece deformation amount with respect to the reaction force of the elastic piece. A proper engagement position of the clip 10 with respect to the pillar 90 is set in this flat region. As a result, the clip 10 is able to be pushed in with low reaction force across a long stroke before the proper engagement position.

The slanted portions 54 extend orthogonal to the base 20 and parallel to the central axis 10a, as shown in FIG. 6, in a direction orthogonal to the plane that includes the left and right slanted portions 54. The distance between the slanted portions 54 that are at opposite sides across the clip central axis 10a is constant in a direction orthogonal to the plane that includes the left and right slanted portions 54.

The elastic pieces 50 are provided symmetrically about the clip central axis 10a, as shown in FIG. 4, in a direction parallel to the plane that includes the left and right slanted portions 54. The elastic piece 50 provided one at each side of the clip central axis 10a is divided into two in a direction orthogonal to the plane that includes the left and right slanted portions 54, as shown in FIG. 6. A space is provided between the two divided elastic pieces 50, and the engagement release lever 40 is arranged in this space. The engagement release lever 40 extends in a direction parallel to the plane that includes the left and right slanted portions 54.

The elastic piece 50 may also have an axial portion 52 that extends in the clip axial direction from the base side end portion of the slanted portion 54 toward the base 20 side. In the illustrated example, the elastic piece 50 is shown having the axial portion 52. When the elastic piece 50 has the axial portion 52, the axial portion 52 extends between the base 20 and the slanted portion 54.

A protruding portion 60 that extends toward the other of the slanted portion 54 is formed on the base 20. As a result, a localized mountain (i.e., a portion where the insertion load becomes large) that appears when the slanted portion 54 abuts against the protruding portion 60 when the clip 10 is inserted into the body retaining hole 92 is able to be formed in the flat region formed in the characteristic of the elastic piece deformation amount with respect to the reaction force of the elastic piece. As a result of this mountain, there is a click feeling when the clip 10 is inserted into the body retaining hole 92. Therefore, non-engagement or partial engagement of the clip 10 is able to be inhibited using this click feeling as an indication of the clip insertion amount. In the description above, non-engagement refers to a state in which, when there is a pair of retaining protrusions 30, neither of the two retaining protrusions 30 catch on the edge portion of the body retaining hole 92, and partial engagement refers to a state in which one of the retaining protrusions 30 does not catch on the edge portion of the body retaining hole 92. For example, in FIG. 4, when the clip 10 is pushed into the body retaining hole 92 and the slanted portion 54 deforms as indicated by the alternate long and short two dashes line (at the upper side), a click feeling is obtained when the slanted portion 54 abuts against the protruding portion 60, so it is evident that the push-in amount is sufficient. When the click feeling is obtained or the clip 10 is pushed in slightly farther from there and is then released, the clip 10 returns slightly by the reaction force of the elastic piece 50, and the peripheral edge portion of the body retaining hole 92 engages with the body retaining surface 38 as indicated by the alternate long and short two dashes line (at the lower side) in FIG. 4, thereby enabling the clip 10 to be properly engaged with the body retaining hole 92. The structure and operation described above may be applied to all of the example embodiments of the invention.

The first example embodiment of the invention also has the structure and operation described below. The relative rotation inhibiting piece 74 includes only a first relative rotation inhibiting piece 74A. This first relative rotation inhibiting piece 74A is connected to the connecting portion 70a of the tether portion 70, and branches off from the connecting portion 70a of the tether portion 70 and extends to near a tip end of the garnish retaining portion 72. One or more of the first relative rotation inhibiting piece 74A is provided. The first relative rotation inhibiting piece 74A extends toward the radially inner side of the curve of the connecting portion 70a. However, the first relative rotation inhibiting piece 74A may also branch off from the connecting portion 70a and extend toward the radially outer side of the curve of the connecting portion 70a, or may branch off high and low from the connecting portion 70a and extend toward the radially inner side and the radially outer side of the curve of the connecting portion 70a. The first relative rotation inhibiting piece 74A has a width that is equal to or less than the width of the connecting portion 70a of the tether portion 70. Therefore, if the connecting portion 70a is able to pass through the tether portion insertion hole 84, then the first relative rotation inhibiting piece 74A is also able to pass through the tether portion insertion hole 84.

When the clip 10 is assembled to the pillar garnish 80, the longitudinal direction of the anchor portion 70b is aligned with the longitudinal direction of the tether portion insertion hole 84, and the anchor portion 70b is inserted through the tether portion insertion hole 84. Then with the anchor portion 70b and the first relative rotation inhibiting piece 74A protruding out from between the two side walls 86a and 86b, the clip 10 is rotated 90 degrees, such that the anchor portion 70b will catch on the two side walls 86a and 86b when the CSA deploys.

The tip end of the first relative rotation inhibiting piece 74A is positioned between the two side walls 86a and 86b while the clip 10 is in a state installed on the pillar garnish. Therefore, when the clip 10 is rotated while the clip 10 is installed on the pillar garnish, at least the tip end of the first relative rotation inhibiting piece 74A and the connecting portion 70a abuts against the inside surfaces of the two side walls 86a and 86b of the tether housing portion 81, and is thus inhibited from relatively rotating any further.

Next, the effects of the pillar garnish mounting structure 1 and the clip 10 according to the first example embodiment of the invention will be described. First, with the pillar garnish mounting structure 1 of the first example embodiment, the anchor portion 70b catches on the end surfaces 87 of the two side walls 86a and 86b in the pillar garnish longitudinal direction, and thus does not catch on the edge portion of the long hole in the bottom wall of the tether housing portion as it does in the related art. Therefore, the distance between the inside surfaces of the two side walls 86a and 86b does not need to be set equal to or greater than the length of the anchor portion as it is in the related art. The distance between the two side walls 86a and 86b is set shorter than the length of the anchor portion 70b so that the anchor portion 70b will catch on the longitudinal direction end surfaces 87 of the side walls 86a and 86b. As a result, the distance between the two side walls 86a and 86b of the tether housing portion 81 is able to be shorter than it is with the clip according to the related art, so even more space is able to be saved with the pillar garnish 80.

Also, the end surfaces 87 of the two side walls 86a and 86b are end surfaces on the vehicle rearward side, and the space between the two side walls 86a and 86b is open in the pillar garnish longitudinal direction. Therefore, the tether housing portion 81 is able to be manufactured by injection molding using a manufacturing mold. Also, there is no need to form an opening for inserting the tether portion 70 in the front wall 85 (with respect to the longitudinal direction of the vehicle) of the tether housing portion 81. Therefore, a weld, which tends to form at a portion where flows of molten resin collide behind the opening, will not form on the front wall 85.

The side wall 86a in the center is provided, so the distance between the two side walls 86a and 86b at opposite sides across the space through which the tether portion 70 is inserted is able to be made narrower than it is when the side wall in the center is not provided, i.e., when only the outside side walls 86b and 86c are provided, and the strength of the bottom wall 82 of the tether housing portion 81 is able to be increased.

The end surfaces 87 of the two side walls 86b and 86c slant in a linear or curved manner in a direction that reduces the bending angle of the anchor portion 70b. Therefore, when the pillar garnish 80 moves in a direction away from the pillar 90 and the anchor portion 70b engages with the end surfaces 87 of the two side walls 86a and 86b when the CSA deploys, a large bending force is inhibited from being applied to the base portion of the anchor portion of the tether portion 70, so the tether portion 70 is able to be inhibited from being damaged.

With the pillar garnish mounting structure 1 in which the anchor portion 70b engages with the end surfaces 87 of the two side walls 86a and 86b of the tether housing portion 81 when the CSA deploys, the clip 10 is preferably inhibited from rotating relative to the pillar garnish 80 and coming off.

With the pillar garnish mounting structure 1 according to the first example embodiment of the invention, the relative rotation inhibiting piece 74 is provided on the tether portion 70. Therefore, when the shaft portion 22 of the clip 10 is pushed by the deploying CSA 88, the clip 10 is inhibited from rotating relative to the tether housing portion 81, and as a result, the clip 10 is inhibited from coming off of the pillar garnish 80.

In the clip 10 used with the pillar garnish mounting structure 1, the clip 10 has at least one relative rotation inhibiting piece 74 that is connected to at least one of the connecting portion 70a and the anchor portion 70b. The clip 10 that has the relative rotation inhibiting piece 74 is able to be suitably used as a clip that requires that relative rotation with respect to the pillar garnish 80 be inhibited when it is assembled to the pillar garnish 80, such as with a type of clip in which the anchor portion 70b engages with the end surfaces 87 of the two side walls 86a and 86b, for example. The structure above may be applied to all of the example embodiments of the invention, and similar effects are able to be obtained in all example embodiments.

The first example embodiment of the invention also has the effects described below. In the first example embodiment, the relative rotation inhibiting piece 74 is formed only by the first relative rotation inhibiting piece 74A that is connected to the connecting portion 70a of the tether portion 70. With this first relative rotation inhibiting piece 74A, the length of the relative rotation inhibiting piece 74A is able to be shorter than that of a relative rotation inhibiting piece that is connected to the anchor portion 70b, and as a result, material costs can be reduced, and forming and manufacturing are easier.

[Pillar Garnish Mounting Structure 1 and Clip 10 of the Second Example Embodiment]

Next, the pillar garnish mounting structure 1 and the clip 10 according to the second example embodiment of the invention will be described. The structure of the first example embodiment may also be applied corresponding to the second example embodiment of the invention. Hereinafter, the additional structure, operation, and effects of the second example embodiment will be described.

First, the additional structure of the second example embodiment will be described together with the operation. In the second example embodiment, the relative rotation inhibiting piece 74 includes a second relative rotation inhibiting piece 74B that is connected to the anchor portion 70b of the tether portion 70. The relative rotation inhibiting piece 74 may include only the second relative rotation inhibiting piece 74B, or may include both the first relative rotation inhibiting piece 74A and the second relative rotation inhibiting piece 74B. A tip end of the second relative rotation inhibiting piece 74B is positioned between the two side walls 86a and 86b when the clip 10 is in a state attached to the pillar garnish 80. A width of the second relative rotation inhibiting piece 74B is equal, or substantially equal, to the width of the connecting portion 70a of the tether portion 70. The width of the second relative rotation inhibiting piece 74B is smaller than the distance between the inside surfaces of the two side walls 86a and 86b, and smaller than the length of the short side of the tether portion insertion hole 84 of the bottom wall 82. Therefore, if the connecting portion 70a is able to pass through the tether portion insertion hole 84, the second relative rotation inhibiting piece 74B is also able to pass through the tether portion insertion hole 84.

When attaching the clip 10 to the pillar garnish 80, the longitudinal direction of the anchor portion 70b is aligned with the longitudinal direction of the tether portion insertion hole 84, and the anchor portion 70b is inserted through the tether portion insertion hole 84. When the anchor portion 70b and the second relative rotation inhibiting piece 74B (or both the first and second relative rotation inhibiting pieces 74A and 74B when the first relative rotation inhibiting piece 74A is also provided) is protruding out from between the two side walls 86a and 86b, the clip 10 is rotated 90 degrees such that the anchor portion 70b will catch on the two side walls 86a and 86b when the CSA deploys.

If the clip 10 rotates while it is installed on the pillar garnish, at least the tip end of the connecting portion 70a and the second relative rotation inhibiting piece 74B (or both the first and second relative rotation inhibiting pieces 74A and 74B when the first relative rotation inhibiting piece 74A is also provided) will abut against the inside surfaces of the two side walls 86a and 86b of the tether housing portion 81, and be inhibited from relatively rotating any further.

Next, additional effects of the second example embodiment will be described. Because the second relative rotation inhibiting piece 74B is provided on the anchor portion 70b, the clip 10 is inhibited from rotating relative to the tether housing portion 81 and coming off when the clip 10 is pushed by the deploying CSA 88. When the first relative rotation inhibiting piece 74A and the second relative rotation inhibiting piece 74B are provided, the clip 40 is able to be even more reliably inhibited from rotating relative to the tether housing portion 81 than it is when only the first relative rotation inhibiting piece 74A is provided.

What is claimed is:

1. A pillar garnish mounting structure comprising:
   a tether clip having a base, a garnish retaining portion, and a tether portion, the tether portion including:
   a connecting portion;
   an anchor portion formed on a tip end of the connecting portion; and
   a first relative rotation inhibiting piece branching off from the connecting portion; and
   a pillar garnish attached to a pillar by the tether clip, the pillar garnish including a tether housing portion having a first side wall and a second side wall, the first side wall and the second side wall being juxtaposed to each other, the first side wall and the second side wall extending in a longitudinal direction of the pillar garnish, wherein:
   the connecting portion is inserted through a space between the first side wall and the second side wall, the connecting portion extending in the longitudinal direction of the pillar garnish, and the connecting portion extends between one of: (i) the base, and (ii) the garnish retaining portion, and the anchor portion in the longitudinal direction of the pillar garnish;
   the anchor portion is positioned outside of the tether housing portion in the longitudinal direction of the pillar garnish, and when the pillar garnish moves in a direction away from the pillar, the anchor portion is configured to engage an end surface of the first side wall and an end surface of the second side wall in the longitudinal direction of the pillar garnish;
   when the tether portion rotates relative to the tether housing portion, the first relative rotation inhibiting piece is configured to inhibit further relative rotation of the tether portion by abutting against the first side wall and the second side wall of the tether housing portion; and
   at least a portion of the first relative rotation inhibiting piece is positioned in the space between the first side wall and the second side wall.

2. The pillar garnish mounting structure according to claim 1, wherein the end surface of the first side wall and the end surface of the second side wall are end surfaces on a vehicle rearward side of the first side wall and the second side wall.

3. The pillar garnish mounting structure according to claim 2, wherein:
   the pillar garnish has a main body wall that extends over an entire length of the pillar garnish, the main body wall connects a first end portion of the first side wall to a first end portion of the second side wall;
   the tether housing portion has a bottom wall and a front wall, the bottom wall has an insertion hole that is large enough for the anchor portion to be inserted through, the bottom wall connects a second end portion of the first side wall to a second end portion of the second side wall;
   the first end portion of the first side wall is positioned at a side opposite the second end portion of the first side wall, the first end portion of the second side wall is positioned at a side opposite the second end portion of the second side wall; and
   the front wall connects the first side wall to the second side wall at a side opposite to the end surfaces of the first side wall and the second side wall.

4. The pillar garnish mounting structure according to claim 1, wherein:
   the tether housing portion has a third side wall that is juxtaposed to the first side wall and the second side wall; and
   the first side wall is positioned between the second side wall and the third side wall, and the first side wall is parallel to the second side wall.

5. The pillar garnish mounting structure according to claim 1, wherein each of the end surfaces of the first side wall and the second side wall has a predetermined portion that engages the anchor portion when the pillar garnish moves in a direction away from the pillar, the predetermined portion is slanted to a plane perpendicular to an axial direction of the tether clip.

6. The pillar garnish mounting structure according to claim 1, further comprising a recessed portion recessed in a direction away from the anchor portion in the longitudinal direction of the pillar garnish, the recessed portion being formed on: (i) a portion of the first side wall facing the anchor portion, and (ii) a portion of the second side wall facing the anchor portion.

7. The pillar garnish mounting structure according to claim 1, wherein the first relative rotation inhibiting piece extends toward the base.

8. The pillar garnish mounting structure according to claim 1, wherein:
the tether portion has a second relative rotation inhibiting piece, the second relative rotation inhibiting piece is connected to the anchor portion, and when the tether portion rotates relative to the tether housing portion, the second relative rotation inhibiting piece is configured to inhibit further relative rotation of the tether portion by abutting against the first side wall and the second side wall of the tether housing portion; and
at least a portion of the second relative rotation inhibiting piece is positioned in the space between the first side wall and the second side wall.

9. The pillar garnish mounting structure according to claim 1, wherein:
the garnish retaining portion has a rising portion and a bulging portion;
the rising portion rises from the base; and
the bulging portion extends from a tip end of the rising portion in a direction away from the base, and the bulging portion bulges out in a direction orthogonal to a rising direction of the rising portion.

10. The pillar garnish mounting structure according to claim 1, wherein:
the relative rotation inhibiting piece is connected to the anchor portion, and when the tether portion rotates relative to the tether housing portion, the relative rotation inhibiting piece is configured to inhibit further relative rotation of the tether portion by abutting against the first side wall and the second side wall of the tether housing portion.

11. The pillar garnish mounting structure according to claim 10, wherein:
the garnish retaining portion has a rising portion and a bulging portion;
the rising portion rises from the base; and
the bulging portion extends from a tip end of the rising portion in a direction away from the base, and the bulging portion bulges out in a direction orthogonal to a rising direction of the rising portion.

12. The pillar garnish mounting structure according to claim 1, wherein a distance between an inside surface of the first side wall and an inside surface of the second side wall is: (i) larger than a width of the connecting portion in a direction perpendicular to the longitudinal direction of the pillar garnish, and (ii) smaller than a length of the anchor portion in a longitudinal direction of the anchor portion.

13. The pillar garnish mounting structure according to claim 12, wherein the anchor portion is configured to rotate relative to the connecting portion clockwise or counterclockwise in a view from a tip side of the tether portion in the longitudinal direction of the pillar garnish.

14. A tether clip comprising:
a base;
a garnish retaining portion that is connected to the base; and
a tether portion including:
a connecting portion,
an anchor portion provided on a tip end of the tether portion; and
at least one relative rotation inhibiting piece connected to at least one of the connecting portion and the anchor portion, the at least one relative rotation inhibiting piece branching off from the connecting portion, and when the tether portion rotates relative to a tether housing portion of a pillar garnish, the at least one relative rotation inhibiting piece is configured to inhibit further relative rotation of the tether portion by abutting against a first side wall of the tether housing portion and a second side wall of the tether housing portion, wherein:
the connecting portion is configured to extend between one of: (i) the base, and (ii) the garnish retaining portion, and the anchor portion in a longitudinal direction of the pillar garnish; and
at least a portion of the at least one relative rotation inhibiting piece is configured to be positioned in a space between the first side wall of the tether housing portion and the second side wall of the tether housing portion.

15. The tether clip according to claim 14, wherein:
the garnish retaining portion has a rising portion and a bulging portion;
the rising portion rises from the base; and
the bulging portion extends from a tip end of the rising portion in a direction away from the base, and the bulging portion bulges out in a direction orthogonal to a rising direction of the rising portion.

* * * * *